United States Patent [19]

Oh

[11] Patent Number: 5,255,147
[45] Date of Patent: Oct. 19, 1993

[54] VERTICAL YOKE PROTECTION SYSTEM

[75] Inventor: Chon S. Oh, Johore, Malaysia

[73] Assignee: Thompson Consumer Electronics, S.A., France

[21] Appl. No.: 977,358

[22] Filed: Nov. 17, 1992

Related U.S. Application Data

[63] Continuation of Ser. No. 624,739, Dec. 3, 1990, abandoned.

[30] Foreign Application Priority Data

Dec. 22, 1989 [GB] United Kingdom ............... 8929103

[51] Int. Cl.$^5$ ................ H02H 3/08; H04N 17/00
[52] U.S. Cl. ........................... 361/93; 361/87; 361/100; 358/139; 358/190; 315/411
[58] Field of Search ............ 361/86, 87, 97, 93, 361/100; 358/139, 190; 315/408, 411

[56] References Cited

U.S. PATENT DOCUMENTS

| | | | |
|---|---|---|---|
| 3,399,324 | 8/1968 | Brown | 315/20 |
| 3,555,348 | 1/1971 | Martin | 315/20 |
| 4,042,858 | 8/1977 | Collette et al. | 315/379 |
| 4,045,742 | 8/1977 | Meehan et al. | 328/9 |
| 4,081,721 | 3/1978 | Haferi | 315/389 |
| 4,176,302 | 11/1979 | Inoue et al. | 315/397 |
| 4,289,994 | 9/1981 | Beaumont | 315/371 |
| 4,297,619 | 10/1981 | Kiteley | 358/60 |
| 4,402,029 | 8/1983 | Fujita | 361/90 |
| 4,642,532 | 2/1987 | Hoover | 315/386 |
| 4,754,206 | 6/1988 | Sorensen | 315/411 |
| 5,093,605 | 3/1992 | Meinertz | 315/411 |

FOREIGN PATENT DOCUMENTS

| | | |
|---|---|---|
| 0319671 | 10/1988 | European Pat. Off. |
| 3022267 | 12/1980 | Fed. Rep. of Germany |
| 1-228271 | 12/1989 | Japan |
| 2056798 | 5/1983 | United Kingdom |

Primary Examiner—Emanuel T. Voeltz
Assistant Examiner—Adolf Berhane
Attorney, Agent, or Firm—Joseph S. Tripoli; Joseph J. Laks; Harvey D. Fried

[57] ABSTRACT

A television apparatus has a horizontal deflection circuit with a transformer for developing a derived secondary power source. A circuit for disabling the horizontal deflection circuit is responsive to a fault condition in the horizontal deflection circuit. A driver stage in a vertical deflection circuit is energized by the secondary power source for supplying vertical deflection current to a vertical deflection yoke. An S-shaping capacitor is coupled in series with the vertical yoke. A circuit for sensing vertical yoke current includes a sampling resistor coupled in series with the vertical yoke and the S-shaping capacitor. The vertical yoke current sensing circuit generates a feedback signal for controlling the vertical deflection circuit during normal operation and generates a fault signal indicative of an overcurrent condition in the vertical yoke. Indication of the overcurrent condition is calibrated to be indicative of fault conditions in the vertical driver stage and/or in the S-shaping capacitor. The disabling circuit is also responsive to the vertical yoke current sensing circuit for disabling operation of the horizontal deflection circuit, which in turn disables the secondary power source and the vertical driver stage. A diode couples the vertical yoke current sensing circuit to the disabling circuit.

30 Claims, 7 Drawing Sheets

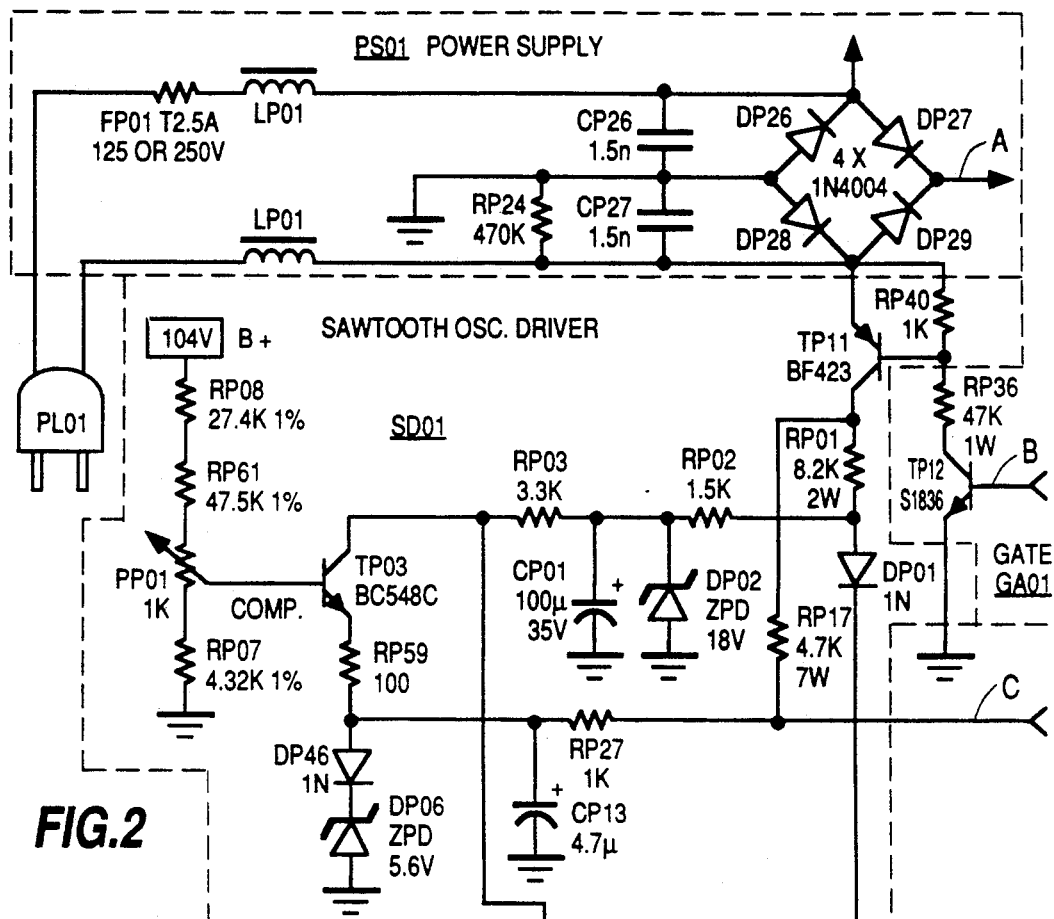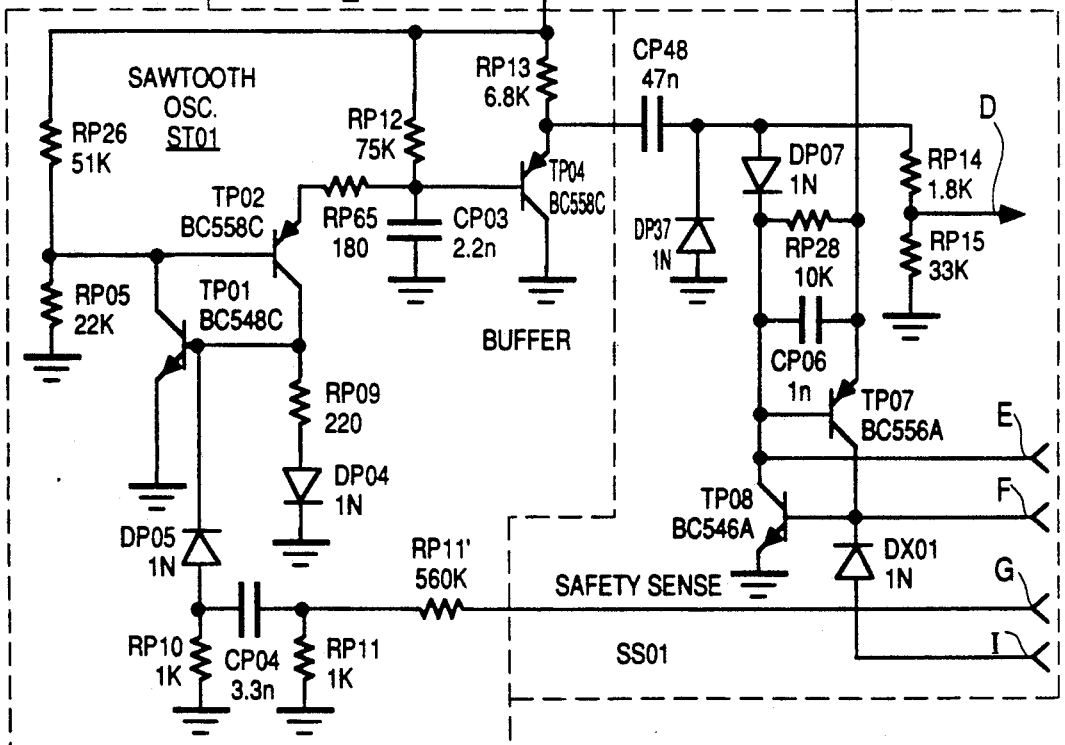
FIG.2

VERTICAL YOKE PROTECTION SYSTEM

This is a continuation of copending application Ser. No. 07/624,739 filed Dec. 3, 1990 now abandoned.

This invention relates generally to the field of overcurrent protection systems, and more particularly, to the field of overcurrent protection circuits for vertical deflection circuits and associated vertical yoke circuits of television apparatus.

Vertical yoke assemblies and associated components of a television receiver are designed to insure that safety hazards are substantially eliminated in the associated design. Typically, a vertical yoke assembly of a television receiver is connected in series with an S-shaping linearity capacitor and sampling resistor. The sampling resistor provides a vertical feedback voltage signal, between a source of high voltage and a reference potential, usually ground. It is important to insure that in the event the S-shaping linearity capacitor is shorted, that the short circuit current flowing through the circuit does not become a safety hazard due to excess power or heat generated in the vertical yoke assembly. Overcurrent conditions in the vertical yoke can also result from faults, for example short circuits, in the vertical driver stage supplying the vertical deflection current to the yoke. It is desirable to protect the vertical yoke from damage due to all such overcurrent conditions. A vertical yoke has a substantially higher impedance, typically 15 ohms, compared to that of a sampling resistor, which often has a resistance in the range of 2 to 3 ohms. Accordingly, most of the power generated by such a short circuit condition will be dissipated in the vertical yoke, rather than in the sampling resistor. None of the attempts to correct this problem have been wholly practical. Such attempts have included the use of fuses or fusible resistors in series with the vertical yoke assembly. Fusible resistors prove unsatisfactory in large measure because there is not enough power dissipating in the resistor to fuse the component and open the circuit path. The mere substitution of components having higher rated voltage or current ratings is often unsatisfactory for a number of reasons. Higher rated components are usually more expensive. Higher rated components such as capacitors, for example, are much larger. Moreover, a higher rated component able to withstand a higher voltage or current will likely only cause a different, lower rated component to fail in its place.

It is an inventive arrangement to provide a practical protection circuit for the vertical yoke assembly of a television receiver, or similar such device.

It is another inventive arrangement to provide a relatively inexpensive protection circuit for preventing damage to a vertical yoke assembly from overcurrent conditions caused by transient phenomena, or the occurrence of a short circuit in a vertical yoke assembly or in the circuitry associated with the vertical yoke assembly.

In accordance generally with these inventive arrangements, the voltage developed across the vertical feedback resistor of the vertical yoke circuit is monitored, for providing a voltage signal indicative of the magnitude of current flowing through the vertical yoke assembly at any given time. Whenever there is an overcurrent condition developed through the vertical yoke assembly, the voltage signal exceeds a predetermined threshold value for initiating operation of a protection circuit, for example one which shuts down the power supply of the television system, thereby removing the drive voltage from the vertical yoke assembly. In this manner, damage to the yoke assembly is prevented, and safety hazards due to the excess flow of current through the yoke assembly and associated series coupled components are avoided.

A television apparatus in accordance with these inventive arrangements has a horizontal deflection circuit with a transformer for developing a derived secondary power source. A circuit for disabling the horizontal deflection circuit when faults occur can be responsive, for example, to an overvoltage condition detected by an x-ray protection circuit, or an overcurrent condition sensed in the horizontal output transistor. A driver stage in a vertical deflection circuit is energized by the secondary power source for supplying vertical deflection current to a vertical deflection yoke. An S-shaping capacitor is coupled in series with the vertical yoke. A circuit for sensing vertical yoke current includes a sampling resistor coupled in series with the vertical yoke and the S-shaping capacitor. The vertical yoke current sensing circuit generates a feedback signal for controlling the vertical deflection circuit during normal operation and generates a fault signal indicative of an overcurrent condition in the vertical yoke. Indication of the overcurrent condition is calibrated to be indicative of fault conditions, for example short circuits, in the vertical driver stage and/or in the S-shaping capacitor. The disabling circuit is also responsive to the vertical yoke current sensing circuit for disabling operation of the horizontal deflection circuit, which in turn disables the secondary power source and the vertical driver stage. A diode couples the vertical yoke current sensing circuit to the disabling circuit.

In further accord with an inventive arrangement, an existing safety sense circuit for protecting the horizontal output stage from overcurrent or overvoltage conditions, for example that associated with an x-ray protection circuit, is also used to monitor the signal indicative of the magnitude of current flowing through the vertical yoke assembly, for responding to vertical yoke overcurrent conditions.

Various inventive arrangements are described below with reference to the accompanying drawings, wherein like items are identified by the same reference designation.

FIG. 2 is a circuit schematic diagram of a portion of a television receiver, showing a power supply, a sawtooth oscillator driver, a sawtooth oscillator, a portion of a gate circuit, and a portion of the protection circuit for one embodiment of the invention.

Figure 1:
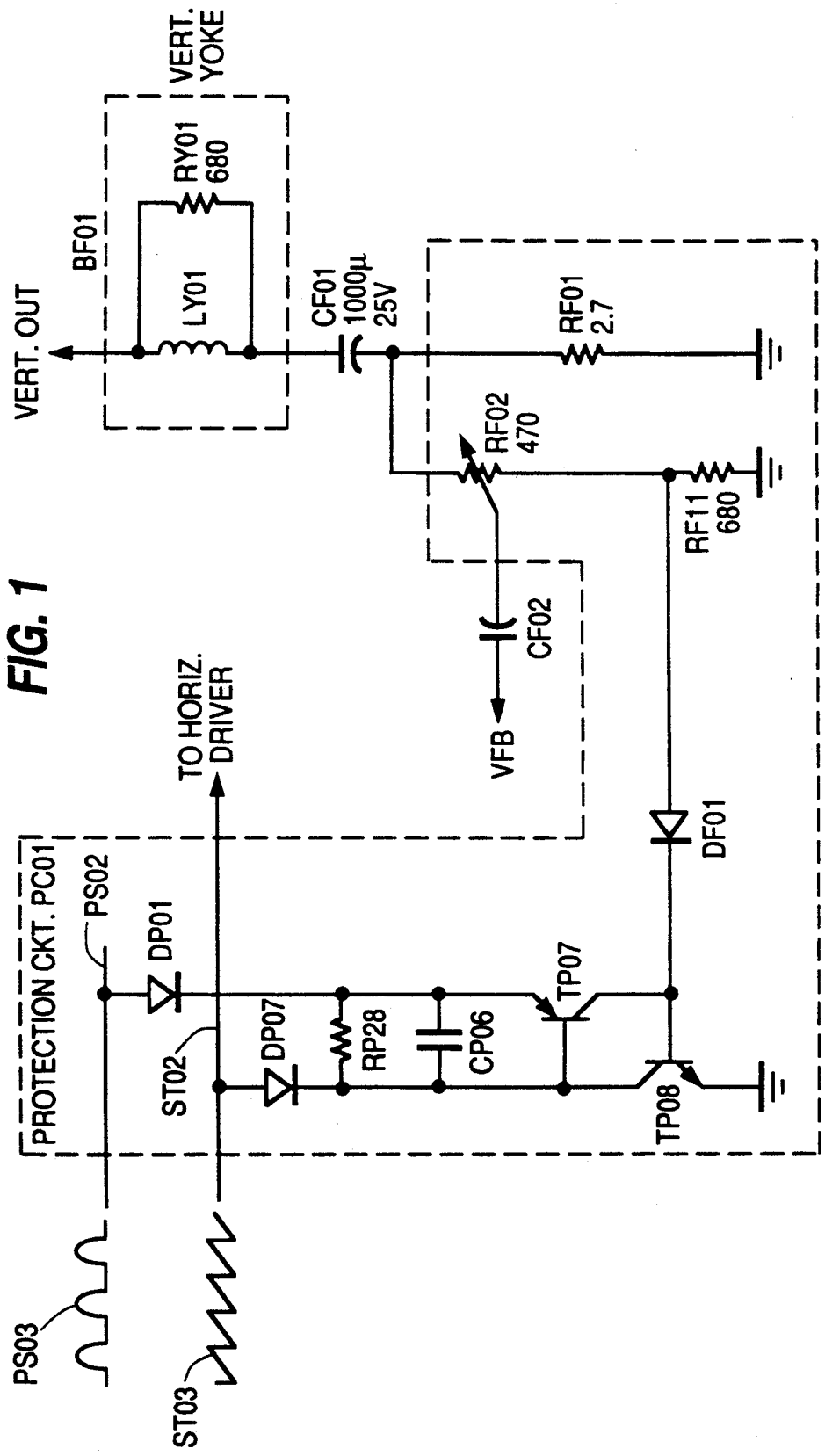
FIG. 1 is a circuit schematic diagram of an inventive arrangement of the invention.
Figure 7:
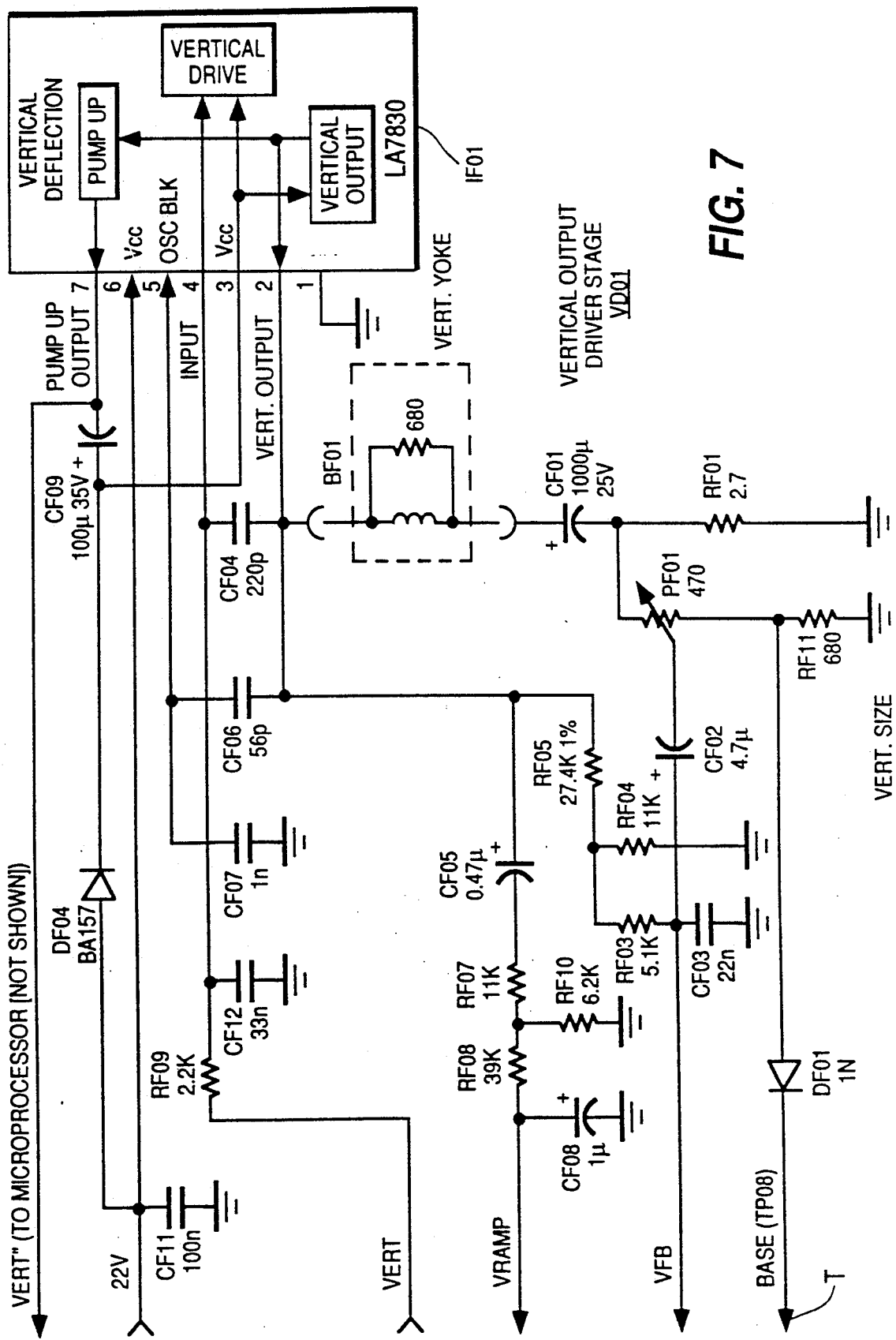
FIG. 7 is a circuit schematic diagram showing the vertical output driver stage for the illustrated television receiver, and other portions of the illustrated embodiment of the invention.

With reference to FIG. 1, A typical vertical yoke assembly BF01 is shown in FIG. 1, and includes an inductor LY01, a resistor RY01 coupled in parallel with the inductor, an S-shaping linearity capacitor CF01 coupled in series with the inductor, and a sampling resistor RF01 coupled in series with the inductor and capacitor. A vertical feedback voltage is developed across the sampling resistor. The feedback voltage developed across resistor RF01 is capacitively coupled by capacitor CF02 to control circuitry of the television receiver, for providing a VFB (vertical feedback) signal thereto. Such an AC feedback component is combined with a DC feedback component, tapped from the input terminal of the vertical yoke, as at the junction of the vertical yoke and capacitor CF04 as shown in FIG. 7. When capacitor CF01 is short circuited, excessive current can flow through the vertical yoke assembly BF01 and resistor RF01. Since the typical impedance of the yoke assembly BF01 is about 15.0 ohms, and that of resistor RF01 about 2.7 ohms, most of the power developed as a result of the short-circuit current is dissipated in the yoke assembly BF01, which can cause excessive heating of the yoke assembly, and possible damage thereto. Excessive heat can pose a safety hazard.

The vertical yoke assembly BF01 is protected from such overcurrent conditions according to an inventive arrangement. The voltage developed across the vertical feedback sampling resistor BF01 is also used for developing a signal indicative of the magnitude of current flowing through the yoke assembly BF01 at any given time. In this example, the vertical feedback voltage is divided down via the series circuit of potentiometer PF01 and resistor RF11, whereby the divided down voltage developed across resistor RF11 provides a signal proportional to the magnitude of current through the yoke assembly BF01. In this example, the vertical yoke overcurrent signal is coupled by a blocking diode DF01 to an SCR-like switching circuit including NPN transistor TP08 and PNP transistor TP07. A speed-up capacitor CP06 is also included between the base and emitter electrodes of TP07, and a shunt resistor RP28 across capacitor CP06. The emitter electrode transistor TP08 is connected to ground, and its base electrode is connected in common with the collector electrode of transistor TP07 to the cathode electrode of blocking diode DF01, the anode electrode of the latter being connected to one end of resistor RF11.

In this example, a blocking diode DP07 has its cathode electrode connected to the common connection of the base and collector electrodes of transistors TP07, and TP08, respectively, with the anode electrode of diode DP07 being connected to a sawtooth signal line ST02, for a sawtooth signal ST03 generated by a sawtooth oscillator described below. Another blocking diode DP01 has an anode electrode connected to a power supply line or conductor PS02 along which half wave rectified voltages PS03 are conducted from a power supply described below. The cathode electrode of diode DP01 is connected to the emitter electrode of transistor TP07.

The value of resistor RF11 relative to that of potentiometer PF01, is such that for normal operation of the vertical yoke assembly, an insufficient level of voltage will be developed across potentiometer PF01 for forward biasing diode DF01 and for turning on transistors TP08 and TP07. However, when excess current begins to flow through the vertical yoke assembly BF01, the voltage developed across resistor RF11 will exceed a predetermined value, causing transistor TP08 to turn on, for in turn turning on transistor TP07 in a regenerative manner, as is known in the art. Transistors TP07 and TP08 will remain turned on or latched until such time that the magnitude of current through their respective collector and emitter electrode current paths reduces to below a sustaining value of magnitude. In this example, which is made relatively simplistic for purposes of initial illustration, when transistor TP07 so turns on, the voltage line PS02 is about three diode drops above ground, and the sawtooth voltage line ST02 is about two diode drops above ground. Substantial grounding of voltage line PS02 prevents the half wave rectified signals PS03 from being supplied to a sawtooth generator described below. The substantial grounding of sawtooth voltage line ST02 assists in insuring the rapid turn-off of the sawtooth generator.

In this manner, during times of overcurrent through the vertical yoke assembly BF01, the protection circuit PC01 very rapidly shuts down the power supply section of the television receiver, for removing the vertical deflection or drive voltages from the vertical yoke assembly BF01. When the latter occurs, the voltage developed across resistor RF11 substantially falls to ground. The current flowing through the collector and emitter electrodes of each one of transistors TP07 and TP08 rapidly diminishes in magnitude, causing these transistors to turn off, thereby restoring power to the sawtooth oscillator. In turn, the vertical deflection voltages are restored. If the overcurrent condition still exists, such as caused by a short circuit of capacitor CF01, the cycle will be repeated, whereby protection circuit PC01 will turn on to remove the vertical deflection voltages from the yoke assembly BF01. The circuit will keep cycling in this manner, until the television set is turned off, or the overcurrent condition removed.

As will be described in greater detail below, as shown in FIG. 2, the illustrated television receiver includes a safety sense circuit SS01 that is substantially the same as the protection circuit PC01, shown in FIG. 1. Safety sense circuit SS01 responds to overcurrent conditions in the horizontal output stage of the television receiver, for shutting down the same in the event of such an overcurrent condition. According to an inventive arrangment, the same safety sense SS01 used for protecting the horizontal output stage can also be used for protecting the vertical yoke assembly from excessive current, by feeding a portion of the vertical feedback signal back to the safety sense circuit, for example through diode DF01, as an auxiliary trigger for the safety sense circuit. Alternatively, a separate but similar protection circuit can be used just for the protection of the vertical yoke assembly, but this can be excessively expensive in comparison to the illustrated arrangement.

The invention will now be described in greater detail, along with various selected portions of the illustrated television receiver. With reference to FIG. 2, a power supply PS01 includes a plug PL01 for receiving available line voltages; two smoothing inductors or chokes LP01; a pair of filter capacitors CP26 and CP27; a shunt resistor RP24; and a bridge rectifier including diodes DP26 through DP29, respectively. A sawtooth oscillator driver SD01 includes resistors RP08, RP61, RP07, RP59, RP03, RP02, RP01, RP40, and RP27; potentiometer PP01; transistors TP03 and TP11; diodes DP46 and DP01; Zener diodes DP06 and DP02; capacitors CP01 and CP13; with one end of resistor RP08 being connected to receive a supply voltage B+.

A sawtooth oscillator ST01 includes resistors RP26, RP05, RP10, RP11, RP09, RP65, RP12, and RP13; transistors TP01, TP02, and TP04; diodes DP05, and DP04; and capacitors CP04, and CP03. A portion of a gate circuit includes a transistor TP12, and a collector resistor RP36. A substantial portion of a safety sense circuit SS01, includes transistors TP07 and TP08; diodes DX01, DP37, and DP07; resistors RP28, RP14, and RP15; and capacitors CP48 and CP06.

Figure 3:
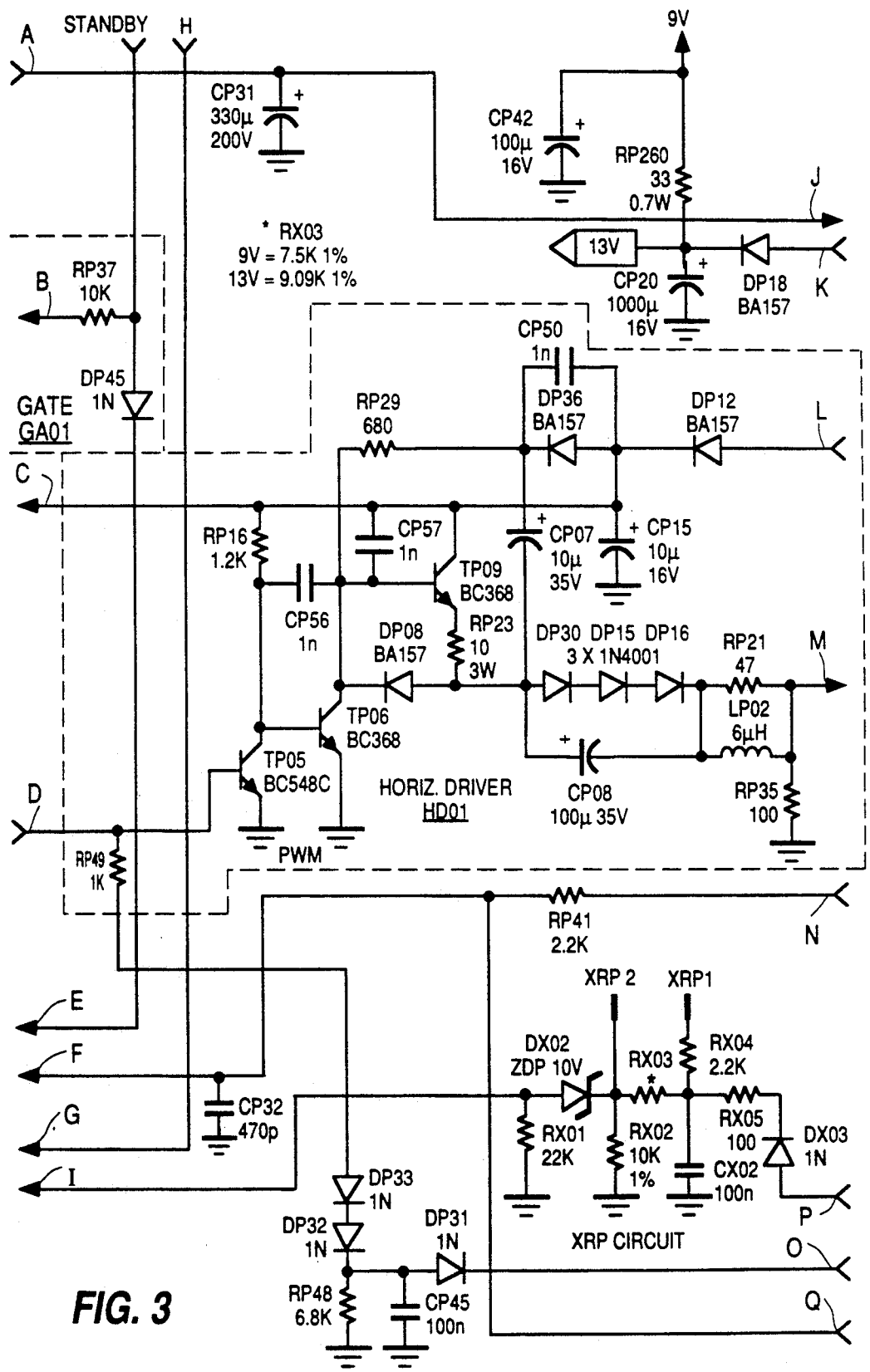
FIG. 3 is a circuit schematic diagram showing the remaining portion of the gate circuit of FIG. 2, a horizontal driver circuit, and various other components of the illustrated television receiver, in this example.

With reference to FIG. 3, the gate circuit GA01 also includes a resistor RP37 and a diode DP45. Also shown is a horizontal driver circuit HD01 including transistors TP05, TP06, and TP09; resistors RP49, RP16, RP29, RP23, RP21, and RP35; capacitors CP56, CP57, CP07, CP08, and CP15; diodes DP08, DP30, DP15, and DP16; and inductor LP02. Also shown is a Standby Sense Section including a Standby line; capacitors CP31, CP42, and CP20; diode DP18; resistor RP260; and a 9-volt voltage line.

Other components shown include portions of an X-ray protection circuit (XRP), including resistors RX01, RX02, RX05, RX03, and RX04; Zener diode DX02; diode DX03; and capacitor CX02. Still further shown are a capacitor CP32; diodes DP31, DP32, and DP33; and resistor RP48.

Figure 4:
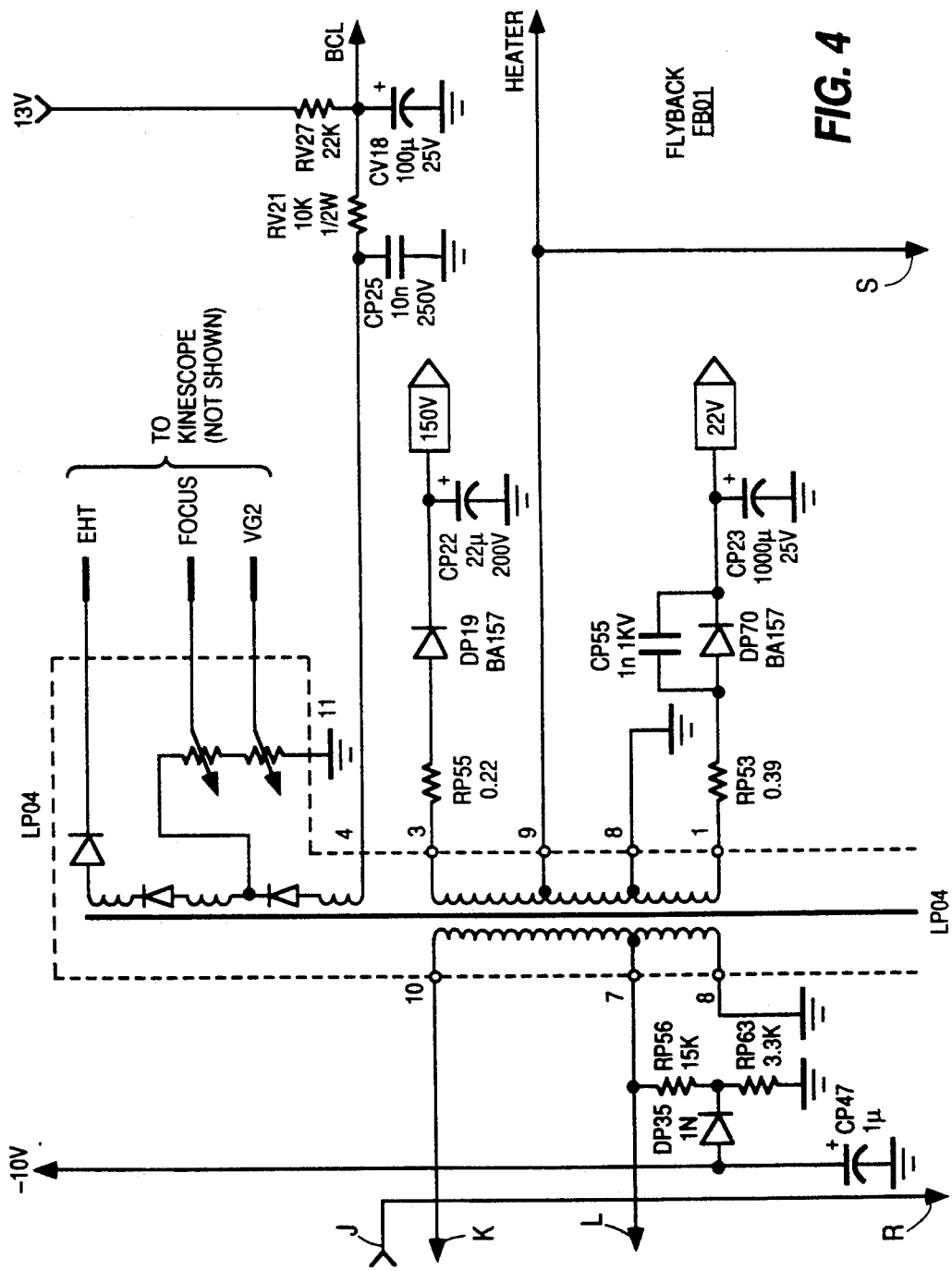
FIG. 4 is a circuit schematic diagram of a portion of the flyback circuit for the illustrated television receiver.

With reference to FIG. 4, a portion of a flyback circuit FB01 includes flyback transformer LP04; capacitors CP47, CP55, CP23, CP25, CV18, and CP22; diodes DP35, DP19, and DP70; and resistors RP56, RP63, RP55, RP53, RV21, and RV27.

Figure 5:
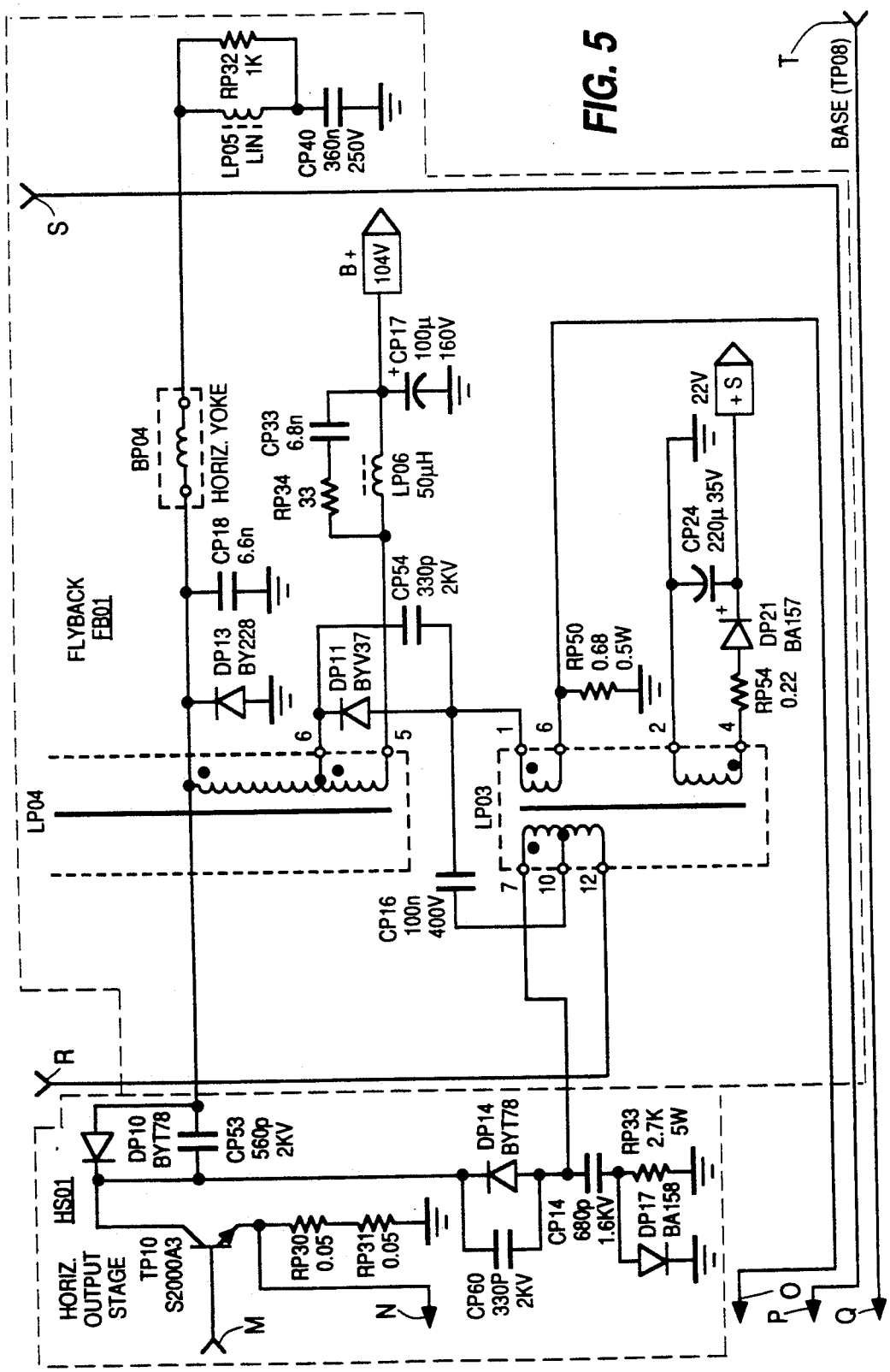
FIG. 5 is a circuit schematic diagram showing the remaining portion of the flyback circuit, and the horizontal output stage for the illustrated television receiver.

With reference to FIG. 5, another portion of the flyback circuit FB01 includes another section of the flyback transformer LP04; capacitors CP16, CP18, CP54, CP24, CP33, CP17, and CP40; diodes DP13 and DP11; a horizontal yoke BP04; transformer LP03; resistors RP50, RP54, RP34, and RP32; diode DP21; inductor LP06; and inductor LP05. Also shown is a horizontal output stage HS01 including transistor TP 10; diodes DP10, DP14, and DP17; capacitors CP60, CP14, and CP53; and resistors RP30, RP31, and resistor RP33, connected as shown.

Figure 6:
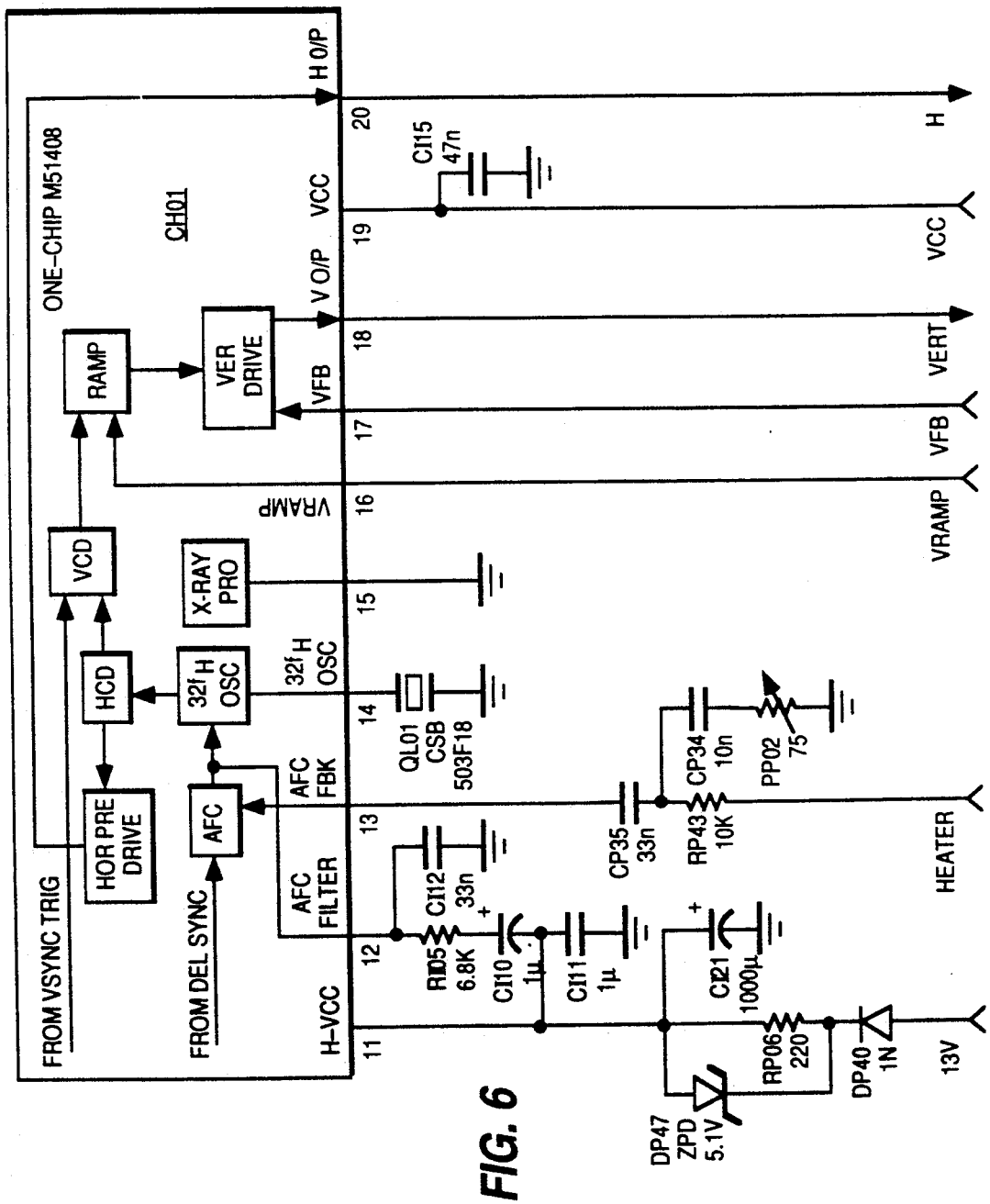
FIG. 6 is a partial block diagram and circuit schematic diagram showing a control chip and associated circuitry for the illustrated television receiver.

With reference to FIG. 6, a "ONE-CHIP M51408", available from Mitsubishi, designated as CH01, receives a vertical ramp signal "VRAMP", a vertical feedback signal VFB, and a voltage VCC. The control chip CH01 outputs a vertical signal "VERT", and a horizontal signal "H". A "HEATER" signal line and a 12-volt voltage line, are also connected to controller CH01. Other components associated with controller CH01, connected as shown, include crystal QL01; capacitors CI10, CI11, CI21, CI12, CP35, CP34, and CI15; diode DP40; Zener diode DP47; and resistors RP06, RI05, and RP43; and potentiometer PP02.

In FIG. 7, a vertical output driver stage VD01 includes a vertical deflection output circuit IF01; the vertical yoke BF01; S-shaping linearity capacitor CF01; vertical feedback sampling resistor RF01; potentiometer PF01; resistor RF11; capacitors CF11, CF08, CF12, CF03, CF07, CF05, CF06, CF02, CF04, and CF09; diodes DF04 and DF01; and resistors RF09, RF08, RF07, RF10, RF03, RF04, and RF05. Resistors RF03, RF04 and RF05 from a network for developing a DC feedback component of the vertical feedback signal VFB, combined with the AC component of the vertical feedback signal at the junction of resistor RF03 and capacitors CF02 and CF03.

Vertical output deflection circuit IF01 is illustrated as an industry type LA7830 integrated circuit. The vertical output stage has a power supply through pin 3 apart from the power supply to the rest of the chip through pin 6. Oscillator blocking (OSC BLK) utilizes pin 5. Diode DF01 provides a signal path permitting the safety sense protection circuit SS01 to protect the vertical yoke assembly BF01, in addition to protecting the horizontal output stage. The value of resistor RF11 is set to insure that the portion of the vertical feedback signal being tapped would not, in normal operation, cause triggering of the safety sense circuit SS01.

Certain portions of the illustrated television receiver operate as now described. The Standby sense signal line shown in FIG. 3 carries a logical control signal provided by a microprocessor (not shown). When power is applied to the television set or receiver, a start-up sequence is initiated via the microprocessor, after which the Standby sense line will go from a low level to a high level voltage or signal. When the Standby line goes high, transistor TP12 (see FIG. 2) responds by turning on. When transistor TP12 turns on, current flows through its collector emitter electrode current path, causing the voltage at its collector electrode to drop substantially toward ground, in turn causing the base electrode of transistor TP11 to go toward ground, turning on the latter. When transistor TP11 so turns on, half wave rectified AC voltages are gated from the power supply PS01 to the sawtooth oscillator driver SD01, and sawtooth oscillator ST01. These pulses charge capacitor CP03 of sawtooth oscillator ST01 to a level high enough to turn on transistor TP02, which in turn turns on transistor TP01. When these transistors so turn on, they rapidly cause capacitor CP03 to discharge through the collector-emitter current path of transistor TP02. When capacitor CP03 discharges below a given level, substantially near zero volts, transistors TP01 and TP02 turn off. The charging process is then re-initiated, and cyclically repeated for producing the basic sawtooth signal ST03 that provides the drive signal for the horizontal output stage HS01 (see FIG. 5). The combination of transistor TP04 and resistor RP13 provide an emitter follower for transferring the sawtooth signal to one end of capacitor CP48. The sawtooth signal is AC coupled through capacitor CP48 to the common connection of diodes DP37 and DP07, and resistor RP14. Diode DP37 sets the DC level, because there is a limitation on the input voltage to transistor TP05 of horizontal driver HD01 (see FIG. 3). The signal goes through a voltage divider including resistors RP14 and RP15 to reduce the voltage applied to the base of transistor TP05.

With further reference to FIG. 3, transistor TP05 of horizontal driver HD01 provides the appropriate pulse width modulation, whereby when transistor TP05 turns on, transistor TP06 turns off, causing a high level signal to be applied to transistor TP10 of the horizontal output stage HS01 (see FIG. 5). The modulation is accomplished by feeding back an output voltage from the flyback transformer LP04. The voltage, in this example 104 volts B+, is connected to one end of resistor RP08 (see FIG. 2) of the sawtooth oscillator driver SD01. The effect of the control circuit is to change the slope of the sawtooth, for changing the turn-on time period of transistor TP05 of horizontal driver HD01, for affecting the pulse width modulation.

The emitter electrode of NPN transistor TP10 of the horizontal output stage HS01 is coupled via resistor RP41 to the base electrode of NPN transistor TP08 of the safety sense circuit SS01. A voltage developed across resistors RP30 and RP31 of the horizontal output stage HS01 (see FIG. 5) provides a current sense signal indicative of the amount of current flowing through the collector emitter main current path of transistor TP10. When the voltage across current sensing resistors RP30 and RP31 exceeds a predetermined level, transistor TP08 of safety sense SS01 turns on, in turn causing transistor TP07 to turn on, as previously described. When this occurs, the collector electrode of transistor TP08, which is connected via diode DP45 to the Standby sense line, pulls that line down toward ground, causing transistor TP12 of gate GA01 to turn off, in turn causing the base electrode of transistor TP11 of sawtooth oscillator SD01 to go high, turning off transistor TP11. When transistor TP11 so turns off, the half wave rectified voltage PS03 (see FIG. 1) from power supply PS01 is disconnected from the sawtooth oscillator driver circuit SD01 and ST01. When the SCR latch formed by transistors TP07 and TP08 turns on, diode DP01 is forward biased via the charge on capacitor CP01, which discharges through the series current path formed by resistor RP02, diode DP01, and the SCR latch of transistors TP07 and TP08. Also, when transistors TP07 and TP08 so turn on, diode DP07 of the safety sense SS01 becomes forward biased, for sinking the sawtooth waveform. ST03 substantially close to ground. Accordingly, the sawtooth signal ST03 is very rapidly removed from the base electrode of transistor TP05 of the horizontal driver circuit HD01.

In this manner, in the event of a fault in the horizontal output stage HS01, the supply of power from power supply PS01 is quickly terminated or shut down, preventing damage to the horizontal output stage HS01 and other circuitry of the television receiver shown in this example. Once transistor TP10 is so turned off, the voltage across series connected resistors RP30 and RP31 is substantially dropped to ground potential, causing the base electrode of transistor TP08 of safety sense SS01 to drop substantially close to ground. At the same time, once capacitor CP01 is substantially discharged, the current flowing through the main current paths of transistors TP07 and TP08 drops toward zero, causing transistors TP07 and TP08 to turn off. Upon turnoff of these transistors TP08 and TP07, the Standby line will again go high, causing transistor TP12 to turn on, in turn causing transistor TP11 to turn on, for supplying half wave rectified voltage from power supply PS01 again to the sawtooth oscillator driver SD01 and sawtooth oscillator ST01. Power will again be restored to the various circuitry of the television receiver. If the overcurrent condition has not been corrected and persists, the safety sense circuit SS01 will continuously cycle on and off in the manner indicated until power is removed from the television set, such as by a user turning off the power switch (not shown).

The safety sense circuit SS01 is also responsive to the x-ray protection circuit (XRP). The base electrode of transistor TP08 of safety sense circuit SS01, as well as the collector electrode of transistor TP07, is connected via blocking diode DX01 to the XRP circuit, for shutting down the supply of power to the television receiver circuitry from power supply PS01 in the manner indicated, in the event that an x-ray producing condition is sensed via the XRP circuit. The One-Chip CH01 connected via diode DP05, coupling capacitor CP04, and resistor RP11 to the base electrode of transistor TP01 via the "H" line. In this example the sawtooth oscillator ST01 operates at less than the horizontal frequency when it is free running. When trigger pulses are available, the sawtooth oscillator ST01 then operates at the standard horizontal frequency.

The inventive arrangements taught herein alleviate a number of potential safety problems associated with possible fault conditions which can occur during operation of the vertical deflection circuit, for example in the vertical yoke assembly and vertical yoke driver stage. The safety problems are largely those which can cause directly, or which otherwise result in overcurrent conditions in the vertical yoke. In particular, are those safety problems resulting from short circuit conditions in the vertical yoke driver stage or across the S-shaping capacitor. The safety problems are alleviated with minimum additional cost by utilizing safety sense circuits of the kind already found in many television apparatus.

What is claimed is:

1. A protection system for a television apparatus, comprising:
   a horizontal deflection circuit having a transformer for generating a derived secondary power source;
   means for disabling said horizontal deflection circuit responsive to a fault condition in said horizontal deflection circuit;
   a vertical deflection drive circuit energized by said secondary power source for driving a vertical yoke; and
   means for sensing vertical yoke current and generating both a vertical yoke current feedback signal for controlling operation of said vertical deflection circuit and a vertical yoke overcurrent condition signal, said disabling means also being responsive to said vertical yoke overcurrent condition signal for disabling operation of said horizontal deflection circuit to disable said secondary power source energizing said vertical deflection circuit.

2. The protection system of claim 1, wherein said vertical yoke current sensing means comprises a sampling resistor coupled in series with said vertical yoke.

3. The protection system of claim 1, comprising means defining a vertical yoke current threshold for disabling said horizontal deflection circuit responsive to said vertical yoke current sensing means, said threshold being indicative of an overcurrent condition in said vertical yoke.

4. The protection system of claim 1, further comprising an S-shaping capacitor coupled in series with said vertical yoke.

5. The protection system of claim 4, comprising means defining a vertical yoke current threshold for disabling said horizontal deflection circuit responsive to said vertical yoke current sensing means, said threshold being indicative of a short circuit condition of said capacitor.

6. The protection system of claim 2, comprising an S-shaping capacitor coupled in series with said vertical yoke and said sampling resistor.

7. The protection system of claim 6, comprising means defining a vertical yoke current threshold for disabling said horizontal deflection circuit responsive to said vertical yoke current sensing means, said threshold being indicative of a short circuit condition of said capacitor.

8. The protection system of claim 1, further comprising a diode coupling said vertical yoke current sensing means to said disabling means.

9. A protection system for a television apparatus, comprising:
   a vertical deflection circuit having a vertical yoke;
   means for sensing vertical yoke current and generating a vertical yoke current feedback signal for controlling said vertical deflection circuit;
   means for sensing said feedback signal to detect a vertical yoke abnormal current condition; and,
   means for disabling said vertical deflection circuit responsive to said abnormal current condition.

10. The protection system of claim 9, wherein said vertical deflection circuit comprises a driver stage disabled responsive to said overcurrent condition.

11. The protection system of claim 9, further comprising:
   a horizontal deflection circuit; and,
   means for sensing a fault condition in said horizontal deflection circuit, said disabling means also being responsive to said overvoltage condition for disabling said horizontal deflection circuit.

12. The protection system of claim 11, wherein said horizontal deflection circuit comprises:
   a transformer; and,
   means coupled to said transformer for generating a derived secondary voltage source for energizing said vertical driver stage.

13. The protection system of claim 12, wherein said disabling means disrupts operation of said horizontal deflection circuit responsive to both said fault condition in said horizontal deflection circuit and said overcurrent condition in said vertical yoke, which in turn disrupts operation of said secondary voltage source and said vertical driver stage.

14. The protection system of claim 9, comprising means, coupled to said sensing means, for defining a vertical yoke current threshold indicative of an overcurrent condition in said vertical yoke.

15. The protection system of claim 9, further comprising an S-shaping capacitor coupled in series with said vertical yoke.

16. The protection system of claim 15, comprising means, coupled to said sensing means, for defining a vertical yoke current threshold indicative of a short circuit condition of said S-shaping capacitor.

17. The protection system of claim 15, wherein said vertical yoke current sensing means comprises a sampling resistor coupled in series with said vertical yoke and said S-shaping capacitor.

18. The protection system of claim 9, wherein said vertical yoke current sensing means comprises a sampling resistor coupled in series with said vertical yoke.

19. The protection system of claim 9, further comprising a diode coupling said vertical yoke current sensing means to said disabling means.

20. A protection system for a television apparatus, comprising:
   a vertical deflection circuit having a vertical deflection yoke and means for supplying vertical deflection current to said yoke;
   an energy source for at least part of said vertical deflection circuit;
   means for sensing vertical yoke current and generating a vertical yoke current feedback signal for controlling said vertical deflection circuit;
   means for sensing said vertical yoke current feedback signal for detecting a vertical yoke abnormal current condition; and,
   means for protecting said vertical deflection yoke by disabling said energy source responsive to said abnormal current condition.

21. The protection system of claim 20, wherein said means for supplying vertical deflection current comprises an output driver stage energized by said energy source.

22. The protection system of claim 20, further comprising:
   a horizontal deflection circuit; and,
   means for sensing a fault condition in said horizontal deflection circuit, said disabling means also being responsive to said overvoltage condition for disabling said horizontal deflection circuit.

23. The protection system of claim 22, wherein said horizontal deflection circuit comprises:
   a transformer; and,
   means coupled to said transformer for generating a derived secondary voltage source as said energy source.

24. The protection system of claim 23, wherein said disabling means disrupts operation of said horizontal deflection circuit responsive to both said fault condition in said horizontal deflection circuit and said abnormal current condition in said vertical yoke, which in turn disrupts operation of said secondary voltage source and said output driver stage.

25. The protection system of claim 20, comprising means for defining a vertical yoke current threshold indicative of an abnormal current condition in said vertical yoke.

26. The protection system of claim 20, further comprising an S-shaping capacitor coupled in series with said vertical yoke.

27. The protection system of claim 20, comprising means for defining a vertical yoke current threshold indicative of a short circuit condition of said S-shaping capacitor.

28. The protection system of claim 26, comprising a sampling resistor coupled in series with said vertical yoke and said S-shaping capacitor.

29. The protection system of claim 20, wherein said vertical yoke current sensing means comprises a sampling resistor coupled in series with said vertical yoke and supplying a signal to both said sensing means.

30. The protection system of claim 20, further comprising a diode coupling said vertical yoke abnormal current sensing means to said disabling means.

* * * * *